United States Patent
Stenneth et al.

(10) Patent No.: US 9,933,548 B1
(45) Date of Patent: Apr. 3, 2018

(54) METHOD, APPARATUS AND COMPUTER PROGRAM PRODUCT FOR PROVIDING LOCAL HAZARD WARNINGS

(71) Applicant: HERE Global B.V., Eindhoven (NL)

(72) Inventors: Leon Stenneth, Chicago, IL (US); Alex Averbuch, Buffalo Grove, IL (US)

(73) Assignee: HERE Global B.V., Eindhoven (NL)

(*) Notice: Subject to any disclaimer, the term of this patent is extended or adjusted under 35 U.S.C. 154(b) by 0 days.

(21) Appl. No.: 15/392,438

(22) Filed: Dec. 28, 2016

(51) Int. Cl.
 *G01W 1/10* (2006.01)
 *G08B 21/10* (2006.01)

(52) U.S. Cl.
 CPC .............. *G01W 1/10* (2013.01); *G08B 21/10* (2013.01)

(58) Field of Classification Search
 CPC ................................. G01W 1/10; G08B 21/10
 USPC ........................................................ 340/601
 See application file for complete search history.

(56) References Cited

U.S. PATENT DOCUMENTS

| | | | |
|---|---|---|---|
| 8,180,502 B2 | 5/2012 | Satoh | |
| 8,599,013 B1 | 12/2013 | Baron, Sr. | |
| 8,660,520 B2 | 2/2014 | Felt et al. | |
| 8,849,505 B2* | 9/2014 | Menard | B60J 7/0573 307/9.1 |
| 8,937,546 B1* | 1/2015 | Baron, Sr. | G01W 1/00 340/539.1 |
| 9,398,619 B1 | 7/2016 | Sennett et al. | |
| 2009/0043500 A1* | 2/2009 | Satoh | G01C 21/3461 701/414 |
| 2013/0009780 A1* | 1/2013 | Marshall | G01W 1/10 340/601 |
| 2013/0194093 A1* | 8/2013 | Rakijas | G08B 27/006 340/539.13 |
| 2014/0002277 A1 | 1/2014 | Fulger et al. | |
| 2017/0075034 A1* | 3/2017 | Kleeman | G01W 1/10 |
| 2017/0132929 A1* | 5/2017 | Mays | G08G 1/161 |
| 2017/0166123 A1* | 6/2017 | Bahgat | B60Q 9/008 |

FOREIGN PATENT DOCUMENTS

EP          1 881 346 A1      1/2008

OTHER PUBLICATIONS

All Hazards Risk Assessment Methodology Guidelines 2012-2013, Public Safety Canada (dated 2012-2013) 77 pages.
Convex Hull—Wikipedia [online] [retrieved Apr. 17, 2017]. Retrieved from the Internet: <URL: https://en.wikipedia.org/wiki/Convex_hull>. (dated Apr. 15, 2017) 6 pages.

* cited by examiner

*Primary Examiner* — Hirdepal Singh
(74) *Attorney, Agent, or Firm* — Alston & Bird LLP

(57) ABSTRACT

Embodiments described herein may provide a method for providing a local hazard warning to vehicles or devices at locations near an observed weather condition. Methods may include: receiving an indication of an observed weather condition from a probe; receiving an indication of a location of the observed weather condition from the probe; generating an estimation of a local hazard at a plurality of locations proximate the location of the observed weather condition; generating a confidence level of the local hazard at each of the plurality of locations proximate the location of the observed weather condition; and generating a local hazard warning for at least one of the plurality of locations in response to the confidence level for the at least one of the plurality of locations satisfying a predefined measure.

17 Claims, 7 Drawing Sheets

METHOD, APPARATUS AND COMPUTER PROGRAM PRODUCT FOR PROVIDING LOCAL HAZARD WARNINGS

TECHNOLOGICAL FIELD

An example embodiment of the present invention relates generally to providing local hazard warnings to an apparatus or device proximate a given location, and more particularly, to a method, apparatus and computer program product for identifying conditions that represent a hazard and extrapolating those conditions over neighboring areas to estimate the confidence and severity of a hazard in those areas.

BACKGROUND

Weather stations may be used to gather information regarding weather-related information at geographically dispersed locations, such that the weather information may be used for historical trend data, current weather reporting, and future weather prediction. Weather stations may include various sensors to gather weather-related information and report an abundance of weather attributes, such as temperature, humidity, barometric pressure, visibility, precipitation, wind speed, wind direction, etc. Weather stations traditionally have included stationary apparatus that included various types of specifically configured sensors to gather weather-related data. These traditional weather stations are conventionally located at airports, military bases, remote outposts, etc. However, certain regions may lack weather stations close by such that weather for an area may not be readily available and of questionable accuracy.

One drawback of using location-based weather data from weather stations is that the weather data may only approximate the weather at a location in which a user is interested. Further, the ubiquity of weather stations may result in an abundance of weather-related information, much of which may not be material to the desired weather information.

BRIEF SUMMARY

A method, apparatus, and computer program product are therefore provided for generating a local hazard warning for a plurality of locations. An apparatus may be provided including at least one processor and at least one non-transitory memory including computer program code instructions. The computer program code instructions may be configured to, when executed, cause the apparatus to at least: receive an indication of an observed weather condition from a probe; receive an indication of a location of the observed weather condition from the probe; generate an estimation of a local hazard relating to the observed weather conditions at a plurality of locations proximate the location of the observed weather condition; generate a confidence level of the local hazard at each of the plurality of locations proximate the observed weather condition, where the confidence level of the local hazard at each of the plurality of locations is calculated using a distance of each respective location of the plurality of locations from the location of the observed weather condition and an elapsed time since the weather condition was observed; and generate a local hazard warning for at least one of the plurality of locations in response to the confidence level for the at least one of the plurality of locations satisfying a predefined measure.

According to some embodiments, causing the apparatus to generate a confidence level includes causing the apparatus to: determine a distance of each of a plurality of locations from the location of the observed weather condition; determine an elapsed time since the observed weather condition was observed; and calculate a confidence of the local hazard at each of the plurality of locations using an inverse ratio of the distance and an inverse ratio of the time such that the time and distance are inversely proportional to the confidence. Each of the plurality of locations includes a reference location for a geographic area, such as the centroid of a tile, and causing the apparatus to generate a local hazard warning for at least one of the plurality of locations may include causing the apparatus to provide a local hazard warning to at least one vehicle located within at least one of the plurality of locations having a confidence level satisfying the predefined measure.

Causing the apparatus to provide a local hazard warning to at least one vehicle may include causing the apparatus to provide a local hazard warning for presentation to a user of the vehicle on a user interface of the vehicle. The apparatus of some embodiments may be caused to generate an estimation of intensity of a weather condition at each of the plurality of locations proximate the location of the observed weather condition. Causing the apparatus to generate an estimation of intensity of a weather condition at each of the plurality of locations may include causing the apparatus to: receive weather radar imagery comprising each of the plurality of locations; and determine, for each of the plurality of locations, an estimation of intensity of a weather condition based on the weather radar imagery corresponding to the respective location. The indication of a weather condition from the probe may include an indication of rain or fog at the location of the probe.

Embodiments of the present invention may provide a computer program product including at least one non-transitory computer-readable storage medium having computer-executable program code instructions stored therein. The computer-executable program code instructions may include program code instructions to: receive an indication of a weather condition from a probe; receive an indication of a location of the observed weather condition from the probe; generate an estimation of a local hazard at a plurality of locations proximate the location of the observed weather condition, where the confidence level of the local hazard at each of the plurality of locations is calculated using a distance of each respective location of the plurality of locations from the location of the observed weather condition and an elapsed time since the weather condition was observed; and generate a local hazard warning for at least one of the plurality of locations in response to the confidence level for the at least one of the plurality of locations satisfying a predefined measure.

According to some embodiments, the program code instructions to generate a confidence level may include program code instructions to: determine a distance of each of a plurality of locations from the location of the observed weather condition; determine an elapsed time since the observed weather condition from the probe was observed; and calculate a confidence of the local hazard at each of the plurality of locations using an inverse ratio of the distance and an inverse ratio of the time such that the time and distance are inversely proportional to the confidence. Each of the plurality of locations may include a reference location for a geographic area, and the program code instructions to generate a local hazard warning for at least one of the plurality of locations includes program code instructions to provide a local hazard warning to at least one vehicle located within at least one of the plurality of locations having a confidence level satisfying the predefined measure. The program code instructions to provide a local hazard warning to at least one vehicle may include program code instructions to provide a local hazard warning for presentation to a user of the vehicle on a user interface of the vehicle.

The computer program product of some embodiments may include program code instructions to generate an estimation of intensity of a weather condition at each of the plurality of locations proximate the location of the observed weather condition. The program code instructions to generate an estimation of intensity of a weather condition at each of the plurality of locations may include program code instructions to: receive weather radar imagery including each of the plurality of locations; and determine, for each of the plurality of locations, an estimation of intensity of a weather condition based on the weather radar imagery corresponding to the respective location. The indication of a weather condition from the probe may include an indication of rain or fog at the location of the probe.

Example embodiments may provide a method including: receiving an indication of an observed weather condition from a probe; receiving an indication of a location of the observed weather condition from the probe; generating an estimation of a local hazard at a plurality of locations proximate the location of the observed weather condition; generating a confidence level of the local hazard at each of the plurality of locations proximate the location of the observed weather condition, where the confidence level of the local hazard at each of the plurality of locations may be calculated using a distance of each respective location of the plurality of locations from the location of the observed weather condition and an elapsed time since the observed weather condition was observed; and generating a local hazard warning for at least one of the plurality of locations in response to the confidence level for the at least one of the plurality of locations satisfying a predefined measure.

According to some embodiments, generating a confidence level may include: determining a distance of each of a plurality of locations from the location of the observed weather condition; determining an elapsed time since the observed weather condition was observed; and calculating a confidence of the local hazard at each of the plurality of locations using an inverse ratio of the distance and an inverse ratio of the time such that the time and distance are inversely proportional to the confidence. Each of the plurality of locations may include a reference location for a geographic area, and generating a hazard warning for at least one of the plurality of locations may include providing a local hazard warning to at least one vehicle located within at least one of the plurality of locations having a confidence level satisfying the predetermined measure.

Methods for providing a local hazard warning to at least one vehicle may include providing a local hazard warning for presentation to a user of the vehicle on a user interface of the vehicle. Methods may include generating an estimation of intensity of a weather condition at each of the plurality of locations proximate the location of the weather condition from the probe. Generating an estimation of intensity of a weather condition at each of the plurality of locations may include: receiving weather radar imagery including each of the plurality of locations; and determining for each of the plurality of locations, an estimation of intensity of a weather condition based on the weather radar imagery corresponding to the respective location.

BRIEF DESCRIPTION OF THE DRAWINGS

Figure 1:
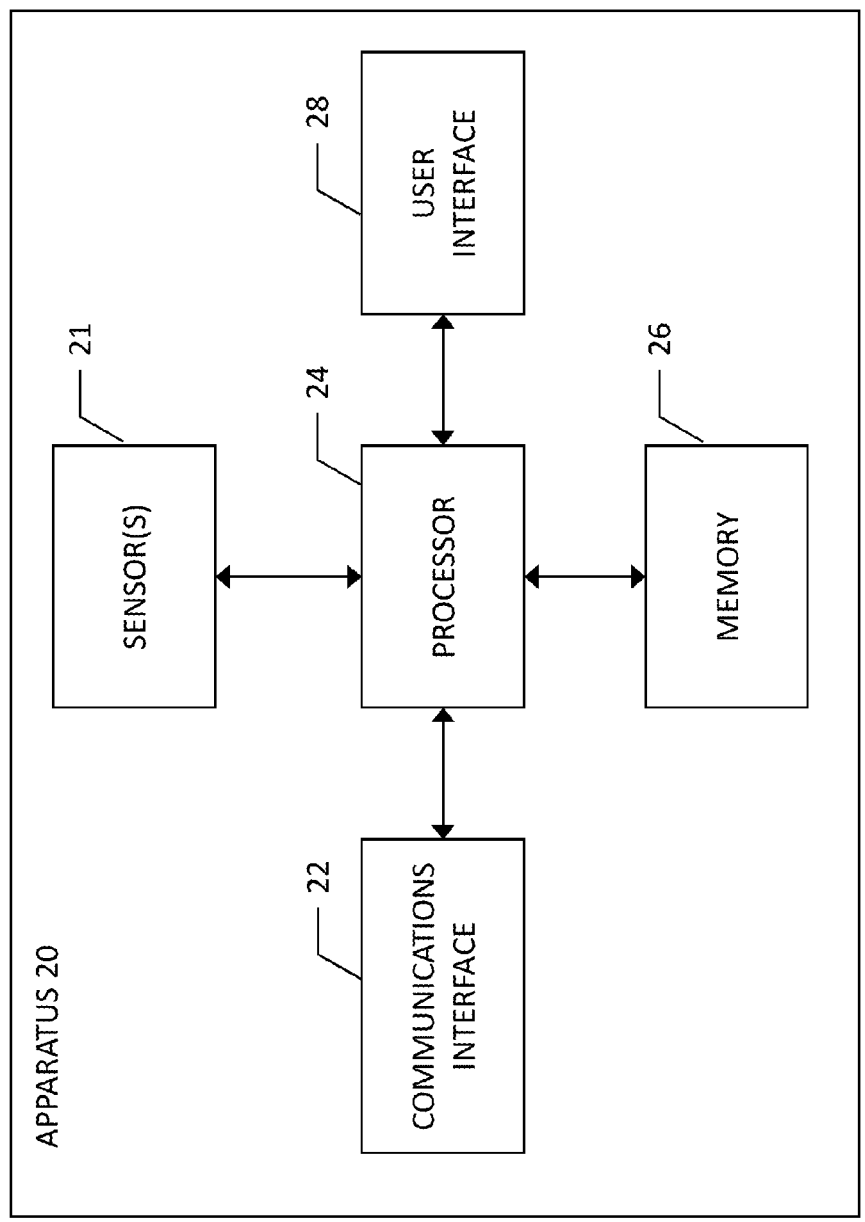
Figure 2:
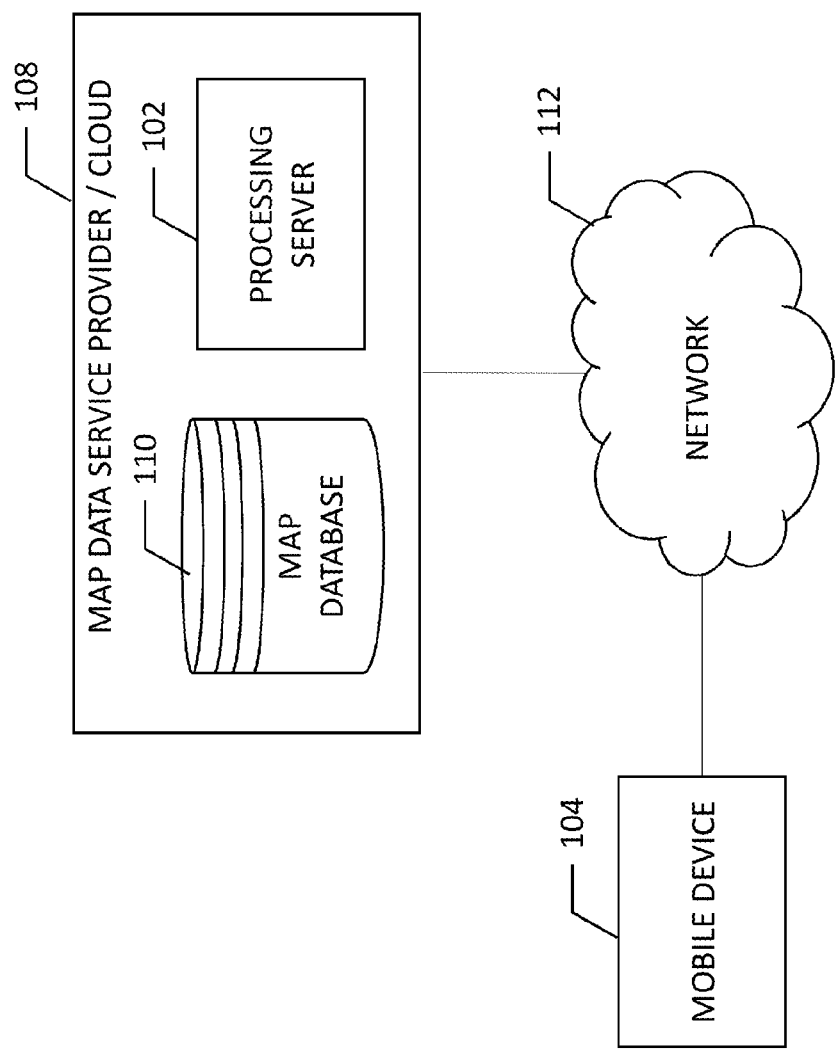
Figure 3:
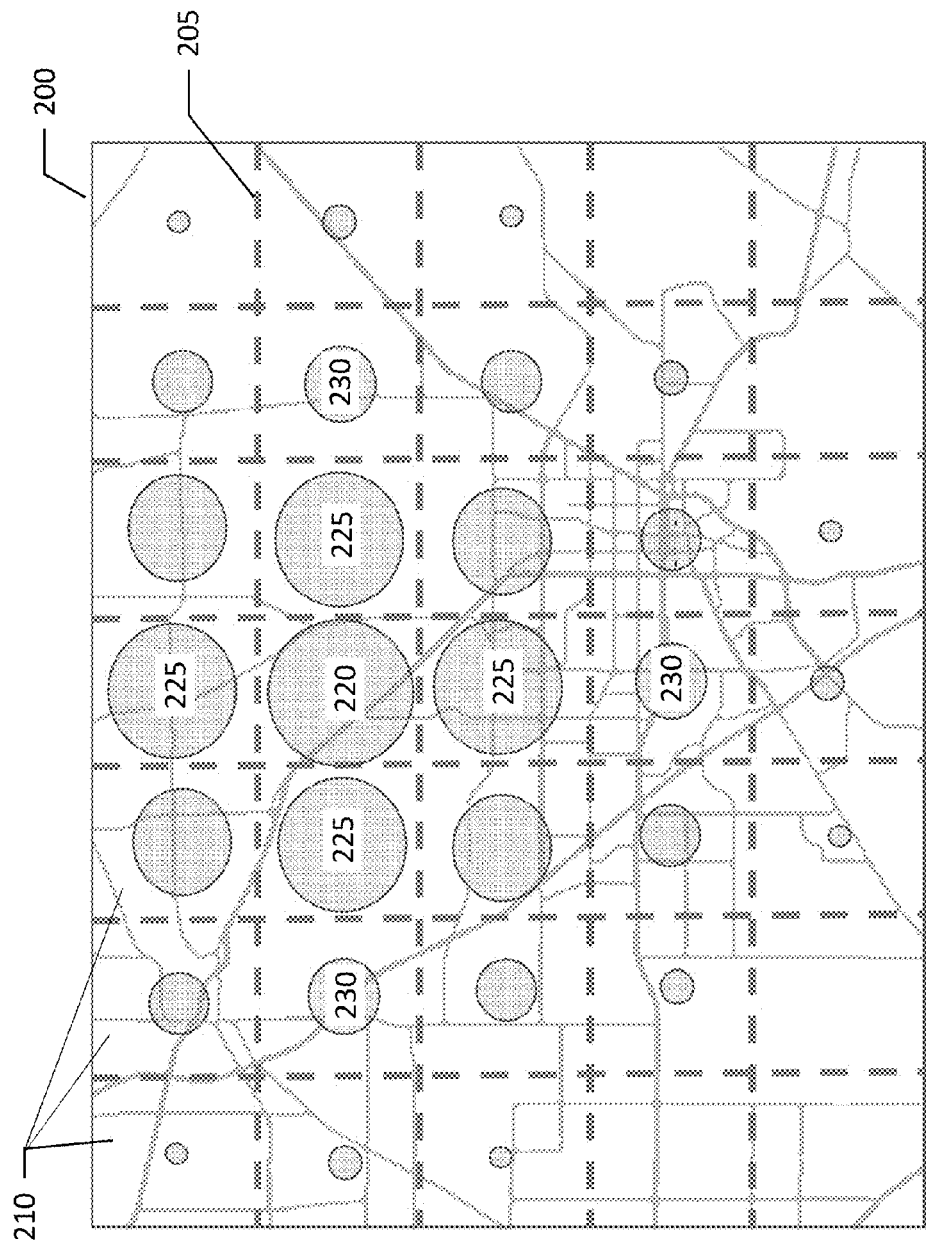
Figure 4:
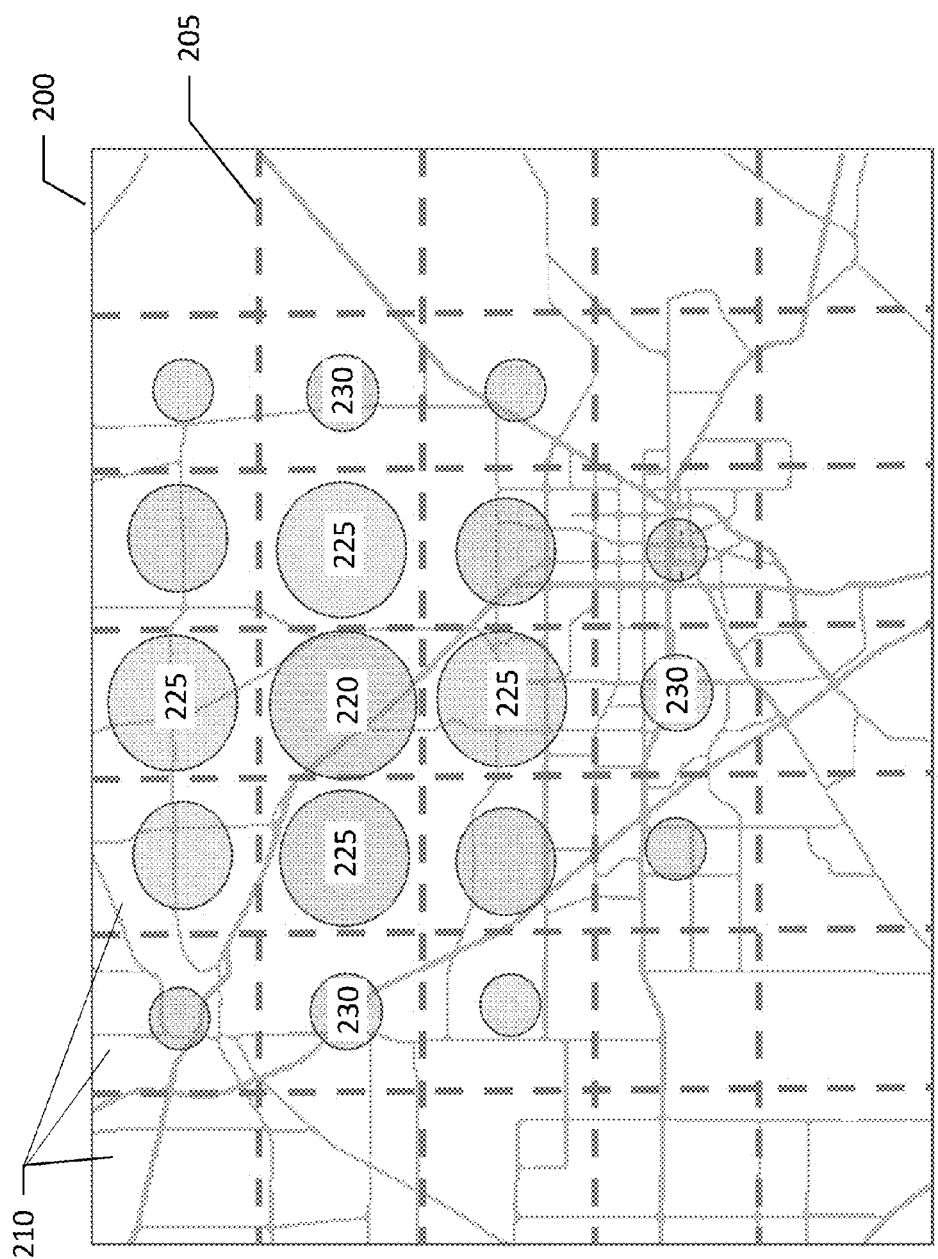
Figure 5:
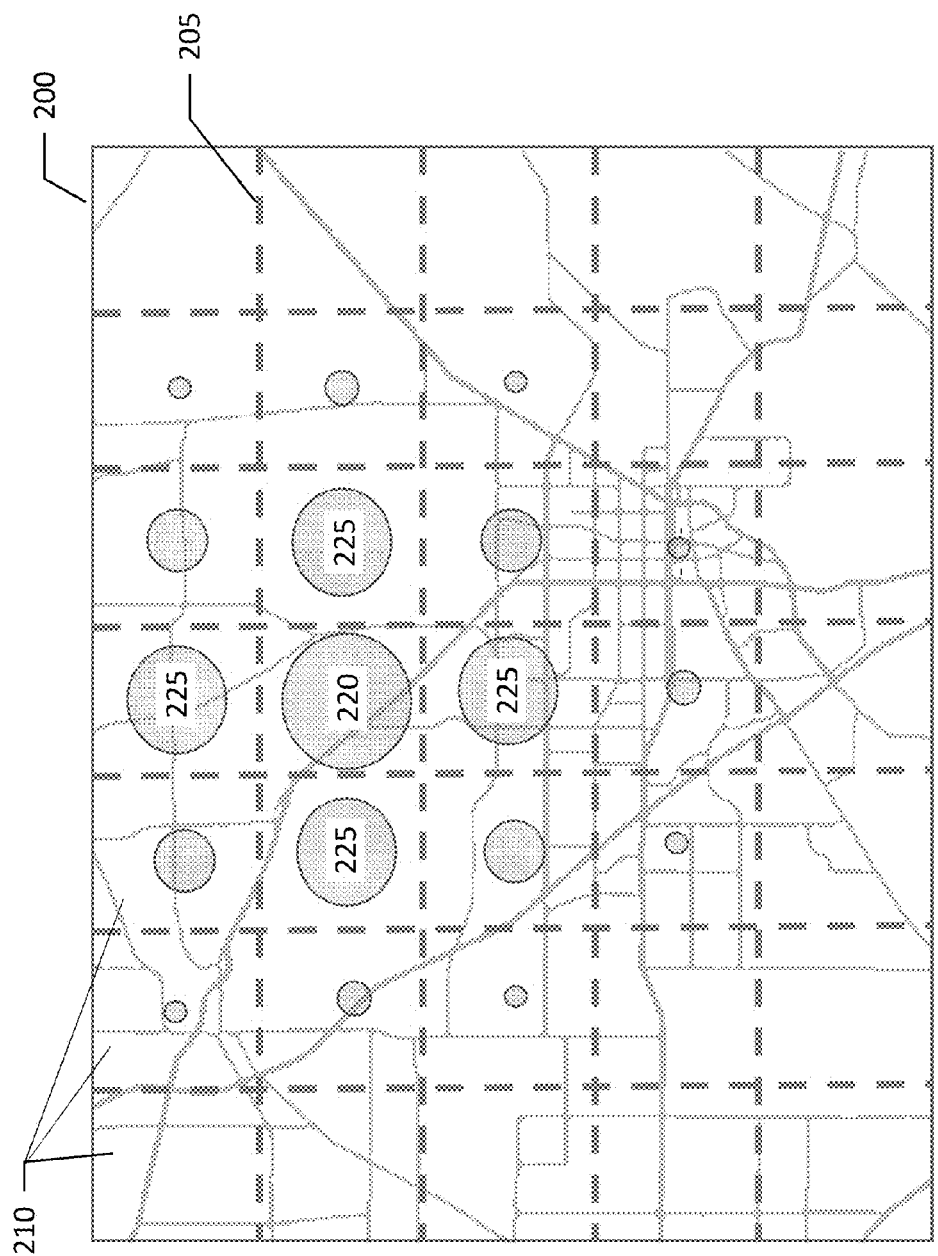
Figure 6:
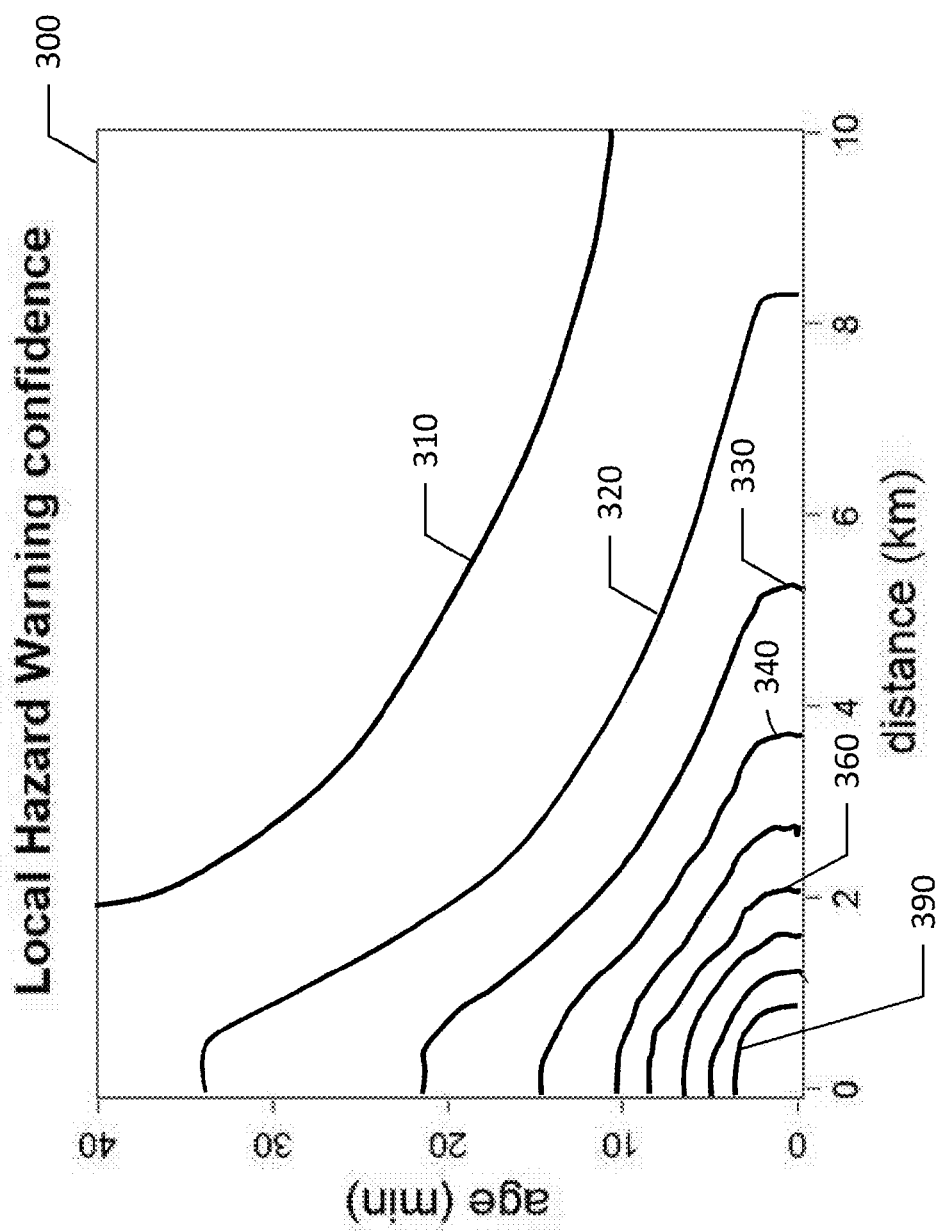
Figure 7:
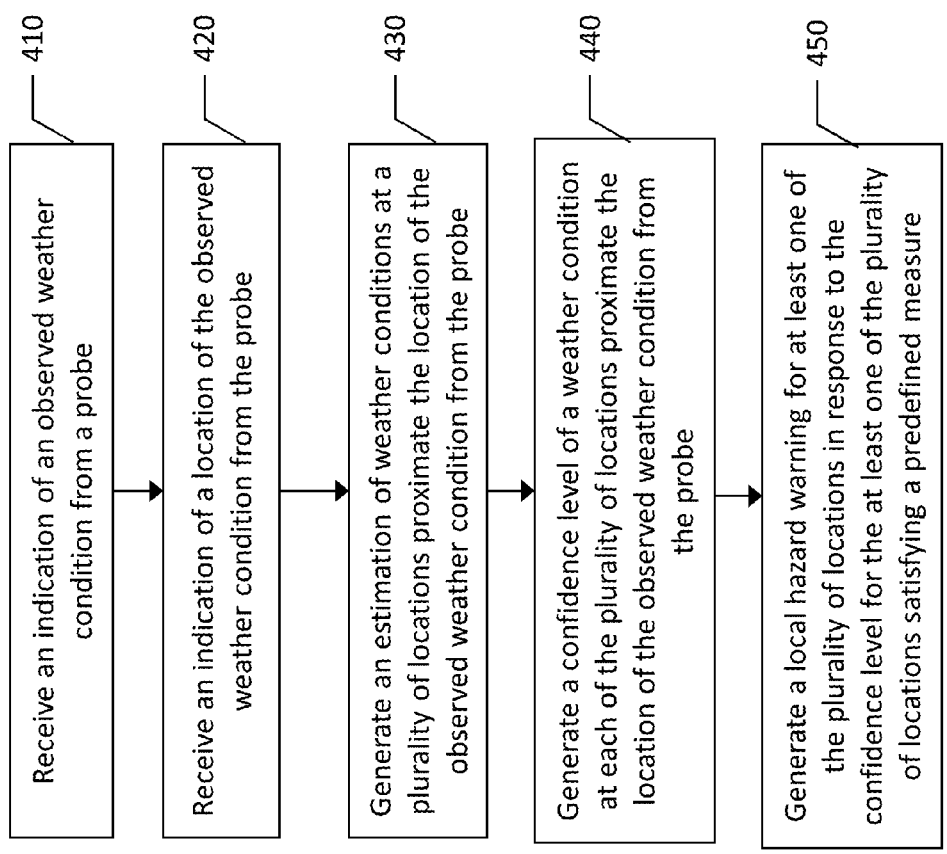

Having thus described certain example embodiments of the present invention in general terms, reference will hereinafter be made to the accompanying drawings which are not necessarily drawn to scale, and wherein:

FIG. 1 is a block diagram of an apparatus according to an example embodiment of the present invention;

FIG. 2 is a block diagram of a system for generating a local hazard warning according to an example embodiment of the present invention;

FIG. 3 is an example map of a region including tile sections of the region and their respective confidence level for a local hazard warning according to an example embodiment of the present invention;

FIG. 4 is another example map of a region including tile sections of the region and their respective confidence level for a local hazard warning according to an example embodiment of the present invention;

FIG. 5 is still another example map of a region including tile sections of the region and their respective confidence level for a local hazard warning according to an example embodiment of the present invention;

FIG. 6 is a contour map of confidence level curves as they relate to distance from an observed condition and a time since the condition was observed according to an example embodiment of the present invention; and FIG. 7 is a flowchart of a method for generating a local hazard warning according to an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment of the present invention for providing local hazard warnings to an apparatus or device proximate a given location. In this regard, a user interface of a device, such a mobile device or a device affixed to a vehicle, such as to a dashboard or the like, may provide hazard warnings to a user, which may aid the user in navigation or driving in an instance in which the user is traveling by vehicle. The display of a device such as a navigation system may provide information to a driver about hazards at or near their current location or hazards that are upcoming along their route or potential route.

As described herein, example embodiments of the claims may provide for a local hazard warning system. Local hazard warnings may be provided to a user via any available device, such as a mobile phone, tablet computer, fixed computer (e.g., desktop computer), or the like. One example embodiment that will be described herein includes a user device of a user traveling in a vehicle. Such a device may be a mobile personal device that a user may use within a vehicle and outside of a vehicle environment, while other devices may include a vehicle navigation system. In some embodiments, the mobile personal device may double as a vehicle navigation system.

While the term "navigation system" is used herein to describe a device used to present map data, traffic data, etc., it is to be appreciated that such a navigation system can be used via a user interface without providing route guidance information. Route guidance is provided in response to a user entering a desired destination, and where a route between the origin or current location of a user and the destination is mapped and provided to the user. Conversely, as described herein, a navigation system may be used in the absence of a discrete destination to provide driver assistance and information.

Example embodiments described herein may provide a user device or navigation system where a portion of a user interface is used to present a local hazard warning to a user. A warning may include an alert to a user that adverse weather conditions are present proximate the user. The warning may be generated based on crowd-sourced weather-related information from vehicles, where the vehicles may be configured to report instances of adverse weather, including precipitation or foggy conditions. Precipitation may be in the form of rain, snow, sleet, hail, or ice, and the warning may communicate the severity of the condition in certain circumstances. The warning may be provided to a user of a device via a user interface, which may indicate that the warning corresponds to a current location of the user, or an anticipated future location of the user.

FIG. 1 is a schematic diagram of an example apparatus configured for performing any of the operations described herein. Apparatus 20 is an example embodiment that may be embodied by or associated with any of a variety of computing devices that include or are otherwise associated with a device configured for gathering weather related information and/or for presenting local hazard warnings to a user via a user interface. For example, the computing device may be a mobile terminal, such as a personal digital assistant (PDA), mobile telephone, smart phone, personal navigation device, smart watch, tablet computer, camera or any combination of the aforementioned and other types of voice and text communications systems. Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped with any number of sensors 21, such as a global positioning system (GPS), humidity sensor, image capture sensor, precipitation sensor, accelerometer, and/or gyroscope. Any of the sensors may be used to sense information regarding the movement, positioning, or orientation of the device and for determining a weather condition at the location of the device as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like). In this regard, the apparatus 20 may interpret sensed data as certain weather conditions and establish location based on other sensor data, such as GPS data, for providing weather condition information for a specific location, for example.

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively or also support wired communication may alternatively support vehicle to vehicle or vehicle to infrastructure wireless links.

According to certain embodiments, the apparatus 20 may support a mapping or navigation application so as to present maps or otherwise provide navigation or driver assistance. In order to support a mapping application, the computing device may include or otherwise be in communication with a geographic database, such as may be stored in memory 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, LIDAR, ultrasonic and/or infrared sensors.

In example embodiments, a user device user interface and/or navigation system user interface may be provided to provide information or driver assistance to a user traveling along a network of roadways. Devices and systems may receive an indication of a current location of the user, and any location based hazard warnings associated with the current location of the device and user. While a service provider may be specifically configured to provide local hazard warnings to a user, such a service may be enhanced or improved through cooperation with a map-based service provider. A user in their home may be able to watch television, visit a website on the internet, or listen to a radio station to understand weather patterns and potential hazard warnings at their relatively stationary location. However, when traveling, a user's location may be readily changing and their ability to continually monitor weather conditions or potential hazards may be limited. As such, a navigation system may be an ideal counterpart to a location-based hazard warning system as described herein. It is, however, appreciated that example embodiments described herein can be implemented outside of a navigation system, such as on a user device or other device that may not necessarily also provide navigation services.

According to example embodiments, map service provider database may be used to provide driver assistance via a navigation system. FIG. 2 illustrates a communication diagram of an example embodiment of a system for implementing example embodiments described herein using a navigation system and a map data service provider. The illustrated embodiment of FIG. 2 includes a mobile device 104, which may be, for example, the apparatus 20 of FIG. 1, such as a mobile phone, an in-vehicle navigation system, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data or location-based hazard warning data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LIDAR, can be used to generate map geometries directly or through machine learning as described herein. However, the most ubiquitous form of data that may be available is vehicle data provided by vehicles, such as mobile device 104, as they travel the roads throughout a region. These vehicles or probes may be embodied by mobile device 104 and may provide data to the map data service provider in the form of traffic speed/congestion data, weather information, location, speed, direction, etc.

The map database 110 may be a master map database stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

Information regarding a geographic region may be stored in the map database, such as a segmentation of a geographic region into a plurality of "tiles" by overlaying a virtual grid over a region. Each square or rectangular tile within the grid (though it could be any polygon shape, regular or irregular) may include a reference point for the respective tile. In a regular-shaped polygon, that reference point may be a centroid of the tile. The tiles may have any size or area, but may be sized according to a uniform grid for an entire map or region, or may be sized based on a density of map elements, such as points of interest, within a region.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can be embodied by the apparatus 20 of FIG. 1 and can include an Advanced Driver Assistance System (ADAS) which may include an infotainment in-vehicle system or an in-vehicle navigation system, and/or devices such as a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 104 for navigation and map functions such as guidance and map display, for example, and for determination of useful driver assistance information, according to some example embodiments.

Driver assistance information may be communicated to a user via a display, such as a display of user interface 28 of apparatus 20 of FIG. 1. The display may be a display of a mobile phone, or a screen of an in-vehicle navigation system, for example. In the presentation of the driver assistance information to the user it is important that the information is communicated clearly and in an easily understood manner such that a user may quickly understand the information presented. As a user of a navigation system may be driving a vehicle, it is important that the navigation information including driver assistance information is quickly and easily understood, without requiring substantial user interaction should additional information be needed by the driver.

Example embodiments provided herein provide a method of presenting useful information to a driver through a user device and/or navigation system to alert a user to a local hazard, such as a weather event. Methods described herein establish a hazard and a location, and also identifies other locations potentially affected by the hazard. Users in those locations or users that may soon enter one of the locations may be alerted or warned of the potential hazard. An algorithm has been established to facilitate the generation of a local hazard warning in a manner that is reliable and accurate.

According to an example embodiment, potentially hazardous conditions can be detected by a device, such as a mobile device 104 traveling along a roadway. Example conditions may include fog or precipitation which may be detected by vehicles having capabilities as described above with respect to apparatus 20. The hazardous conditions may be detected by the connected vehicles and methods described herein define the extent of the affected area and the duration of the hazardous conditions. After the extent and the duration of the hazardous conditions are determined by algorithms described herein, the information may be sent to vehicles that may be affected by the hazard. For example, vehicles that are in the same or neighboring regions or tiles as likely to experience the hazardous conditions. The hazardous conditions, the affected regions, and the duration, may be informed by data from multiple vehicles in an area to increase the robustness of the hazard warnings provided to other users or drivers.

An algorithm for a local hazard warning as described herein may use two inputs: A) a list of condition observations, for each observation a location of the device (e.g., a vehicle) experiencing the conditions and a timestamp at which point the conditions were experienced; and B) a list of points (e.g., latitude and longitude) for which an estimation is needed. The list of points could contain any points including, but not limited to, tile centroids as described above, and may depend upon the application. According to an example embodiment, a list of condition observations may include only conditions that deviate from a standard, such as clear visibility (e.g., no fog/haze/smoke) and no precipitation, such that condition observations may only be reported in the event of a hazardous or potentially hazardous condition.

Algorithms of example embodiments output an estimation of a confidence for each of the input list of points for which an estimation is needed, and an estimation of the intensity for each point. The intensity may not be provided by a vehicle or user device (e.g., mobile device 104), as the vehicle or user device may be configured to only report the existence of a potentially hazardous condition. In such an embodiment, each observation of precipitation when the temperature is above a predefined value (e.g., 32 degrees Fahrenheit), may be reported as "rain" without regard for intensity. The threshold above which a vehicle or user device may report an intensity may be set to a value that indicates a degree of intensity. For example, a value of 1.54 inches of rain per hour may be the threshold above which a vehicle is configured to identify the precipitation as a potentially hazardous condition. In such an example, all reports of precipitation may be given a value estimate of 1.54 inches per hour of rain. This value may be adjusted based on a variety of factors. For example, while a rate of 1.54 inches per hour may be considered potentially hazardous during the day, while after sunset, a rate of 1.00 inches per hour may be considered potentially hazardous.

According to certain embodiments, an estimation of the intensity of hazardous conditions may be determined based on both condition observations from a vehicle or device, and weather radar such as Doppler radar maps overlaid with the region to more accurately estimate the intensity of potentially hazardous conditions at a specific location reported by a vehicle or user. This process fuses real, reported precipitation data from a vehicle with radar-based data to more accurately estimate the intensity of a hazardous condition such as precipitation.

In generating an output from the algorithm for producing local hazard warnings, example embodiments may assign a confidence level to the potentially hazardous conditions, where the confidence level is based on a distance and an age of the observation of conditions. The distance is determined based on a distance of the point for which an estimate is needed to the location of the observation of the conditions. The age of the observation is based on how long it has been since the conditions were observed relative to when the estimation is made at a neighboring location. The confidence value of the estimate for hazardous conditions or a hazard warning regarding conditions at the point for which an estimate is needed is inversely proportional to the distance from the observing vehicle or tile in which the conditions were observed. The further the observed conditions are from where the estimate of the hazardous conditions are needed results in a lower confidence that the estimate is accurate. Similarly, the confidence is inversely proportional to the age of the report from the vehicle. The longer the time between the observation of the conditions and the estimate is provided regarding the point for which an estimate is needed regarding the hazardous conditions the lower the confidence level that the estimate is accurate since the source data is becoming old.

According to example embodiments, the output of an algorithm described herein is the area of the region for which local hazard warnings are generated (i.e., hazardous conditions may exist) and the duration of the hazard warning. The size of the region may be determined based on the confidence threshold set. The lower the confidence needed to generate a local hazard warning, the greater the size of a region for which a local hazard warning may be provided. The higher the confidence required for a local hazard warning, the smaller the size of a region for which a local hazard warning may be provided.

FIG. 3 illustrates an example depiction of a map 200 of a region overlaid with a grid 205 dividing the region into a plurality of tiles 210 or polygons, which are in this case, squares. Embodiments described herein may receive observed weather conditions from a location within an area (or tile) of the region 200 identified at 220. The observed conditions may include precipitation that exceeds a threshold for establishing an observation, such as 1.5 inches per hour of rain. The circles within some of the tiles 210 represent the confidence level of a hazardous conditions (such as rain etc.). The larger the circle, the higher the confidence level. As shown, the highest confidence level 220 is in the tile in which the conditions were observed by a vehicle. As the distance of the tiles gets further from the tile of the 220 observed conditions, the confidence level decreases. As shown, the confidence level in tiles 225 directly adjacent to the tile 220 containing the observed conditions remains relatively high, but is less than the confidence level in tile 220. Similarly, as the distance increases, the confidence level decreases as shown by tiles 230. The distance may be measured from tile centroid to tile centroid, or optionally from the location of the observed condition to the centroid of the neighboring tiles.

FIG. 3 illustrates a map 200 of a region in which a certain confidence level is established in order to determine if a local hazard warning is appropriate. In each tile containing a circle, regardless of the size, the confidence level has been established as being above a predetermined value such that a local hazard warning is appropriate. This predefined value may be variable and may be changed based on the topography or conventional weather patterns of a certain region. Further, the confidence level may be adjusted based on the level of caution desired by the service provider. For example, a lower predetermined confidence value or threshold would increase the area over which a local hazard warning is provided and increase the duration for which the warning is provided to users within affected tiles. This may increase "false positives" or warnings regarding local hazards that are not present in a user's location. Conversely, raising the predetermined confidence value or threshold would decrease the area over which a local hazard warning is provided, resulting in more "false negatives" or the absence of warnings when there is a condition meriting a local hazard warning.

FIG. 4 illustrates an example embodiment similar to that of FIG. 3, where the conditions meriting a local hazard warning are observed at a location within tile 220, such that the confidence at 220 is very high. However, the predetermined value for the minimum confidence level for generating a local hazard warning is raised, such that the region over which the local hazard warning is generated is considerably smaller. According to this embodiment, the local hazard warnings are more likely to represent actual hazardous conditions, while there is an increased likelihood that tiles not receiving a local hazard warning (i.e., locations in tiles that do not have circles) that may observe conditions meriting a local hazard warning.

While confidence level of a local hazard warning is inversely proportional to the distance from the observed conditions as illustrated in FIG. 3, the confidence level is also influenced by the time since the conditions were observed. FIG. 5 illustrates the example embodiment of FIG. 3 after an elapsed period of time without additional conditions observed. As shown, the circles are smaller than the corresponding circles of FIG. 3 from the same tiles, representing a decrease in the confidence level. Further, several tiles that had circles in FIG. 3 had confidence levels that fell below the predetermined value, such that the tile no longer includes a circle as the confidence level is low enough that a local hazard warning is not merited. Since the observed conditions are now some amount of time in the past, the confidence is lower that those conditions still exist. The amount of time elapsed represented by the decline in confidence values between FIGS. 3 and 5 may be defined by the local hazard warning service provider. A faster degradation in the confidence level (e.g., when the amount of elapsed time heavily influences the confidence level) results in a lower level of false positives (local hazard warning but no hazardous conditions), but a higher level of false negatives (hazardous conditions present but no warning). A faster degradation of the confidence level based on elapsed time may be desirable in an instance in which many probe data points are available for observed conditions in a region, but may be undesirable where probe data points are sparse.

As described above, several factors may be varied in establishing the locations in which local hazard warnings may be generated. The distance from the observed conditions is inversely proportional to the confidence that the conditions merit a local hazard warning. The influence of distance on the confidence level may be established based on a weighting factor as described further below. The time since the observed conditions occurred is also inversely proportional to the confidence that the conditions merit a local hazard warning. The influence that the time since the observed conditions bears on the confidence can be influenced by a weighting factor. Finally the confidence level calculated from both the distance from the observed conditions and the time since the observed conditions occurred can be tuned to establish a predefined value above which a local hazard warning will be generated for a location (e.g. within a tile).

An equation to generate the confidence level for a location represented by a tile may be established to determine whether a local hazard warning is appropriate. An example equation is provided below, in which the distance "x" is the distance from the observed conditions (or the centroid of a tile in which the conditions were observed) to the centroid of the tile for which the confidence is being calculated. The units of "x" may be kilometers. The time "t" is the time since the observed conditions occurred. This time may be on the order of seconds or minutes, while the units of "t" are minutes. An example equation may include:

$$\text{confidence} = (1 - \exp(-1.85/x)) * (1 - \exp(-7.5/t))$$

The factors of 1.85 related to distance and 7.5 related to time are representative factors established through experimentation. However, different factors may be established by the local hazard warning service provider and may be generated based on experimentation for a particular region, topography, or climate, for example.

As described above, the predetermined value of confidence above which a local hazard warning is generated for a tile may determine the size of the affected region and how long the local hazard warning may be effective for. The two primary parameters of time and distance establish the confidence. The time and distance thresholds can be varied by the predetermined confidence level as depicted in FIG. 6. Plot 300 represents the local hazard warning confidence level based on distance (km) from the observed conditions along the x-axis and age in minutes since the observed conditions occurred in minutes along the y-axis. The curves represent confidence levels, with 310 being a confidence level of 0.1 (or 10%), 320 being a confidence level of 20%, 330 being a confidence level of 30%, up to curve 390 representing a confidence level of 90%. At an age of zero minutes and a distance of zero from the observed conditions, the confidence is essentially 100% since the conditions are actively being observed at that place and time. As the distance increases, the confidence decreases, and as the time increases, the confidence decreases. If a confidence level of 20% is used as the predetermined value above which a local hazard warning is generated, a warning will not be generated at any more than 8.5 kilometers from the observed conditions (time=zero yields maximum distance). Local hazard warnings will similarly not last any longer than 35 minutes (distance=zero yields longest duration). Similarly, if a confidence level of 60% is used as the predetermined value (see curve 360), a local hazard warning will not be generated in any locations more than 2 kilometers from the observed conditions, and will not last any longer than about 8 minutes. Table 1 below illustrates the maximum distance and duration of several predetermined values of confidence level.

TABLE 1

| Confidence cut | Size of hazardous region (km) | Duration of hazard (minutes) |
| --- | --- | --- |
| 0.1 | 17.5 | 70 |
| 0.2 | 8.5 | 35 |
| 0.3 | 5 | 20 |
| 0.4 | 3.5 | 15 |
| 0.5 | 3 | 10 |
| 0.6 | 2 | 7 |
| 0.7 | 1.5 | 6 |
| 0.8 | 1 | 5 |
| 0.9 | 0.75 | 3 |
| 1 | 0.5 | 2 |

A local hazard warning may be delivered to devices within a particular region, such as within a location represented by the tiles over a number of delivery channels. Local hazard warnings may be received by a vehicle over their radio (amplitude modulated (AM), frequency modulated (FM), satellite radio (e.g., Sirius XM®)) or via any other network connection (e.g. WiFi, 4G LTE, 3G, etc.). Distribution over the chosen channels may be determined by a convex hull algorithm to the set of affected tiles, such that the output is a smallest envelope containing the set of centroids of the Euclidian space including the various tiles that include confidence values above the predetermined value.

While the example embodiments described above are based on a single observation of a hazardous condition, multiple vehicles may be experiencing hazardous conditions within a region and a plurality of them may report the hazardous conditions. In such an embodiment, the confidence level of hazardous conditions at any given tile may be based on multiple observations from multiple locations. A single tile may have a confidence level based on observed conditions from multiple observing vehicles in which case the confidence level at that tile may be a combination of the confidence levels from multiple vehicles. The confidence level at a tile may be additive in that confidence levels are summed, confidence levels may be averaged for a tile, or a highest confidence level of a plurality of confidence levels for a tile may be selected as the appropriate confidence level to use for the tile in establishing a local hazard warning.

FIG. 7 is a flowchart illustrative of a method according to example embodiments of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 7 illustrates a method for generating a local hazard warning based on observed weather conditions. An indication of an observed weather condition is received from a probe at 410. The location of the observed weather condition is also received at 420. An estimation of a weather condition at a plurality of locations is generated within proximity of the observed weather condition from the probe at 430. A confidence level of the weather condition at each of the plurality of locations proximate the location of the observed weather condition from the probe is generated at 440. For each location for which the respective confidence level satisfies a predetermined value, a local hazard warning is generated at 450.

In an example embodiment, an apparatus for performing the method of FIG. 7 above may comprise a processor (e.g., the processor 24) configured to perform some or each of the operations (410-450) described above. The processor may, for example, be configured to perform the operations (410-450) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 410-450 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least:

receive an indication of an observed weather condition from a probe;

receive an indication of a location of the observed weather condition from the probe;

generate an estimation of a local hazard relating to the observed weather conditions at a plurality of locations proximate the location of the observed weather condition;

determine a distance of each of the plurality of locations from the location of the observed weather condition;

determine an elapsed time since the observed weather condition was observed;

generate a confidence level of the local hazard at each of the plurality of locations proximate the location of the observed weather condition, wherein the confidence level of the local hazard at each of the plurality of locations is calculated using an inverse ratio of the a distance of each respective location of the plurality of locations from the location of the observed weather condition and an inverse ratio of the elapsed time since the weather condition was observed such that the time and distance are inversely proportional to the confidence level; and generate a local hazard warning for at least one of the plurality of locations in response to the confidence level for the at least one of the plurality of locations satisfying a predefined measure.

2. The apparatus of claim 1, wherein each of the plurality of locations comprises a reference location for a geographic area, and wherein causing the apparatus to generate a local hazard warning for at least one of the plurality of locations comprises causing the apparatus to:

provide a local hazard warning to at least one vehicle located within at least one of the plurality of locations having a confidence level satisfying the predefined measure.

3. The apparatus of claim 2, wherein causing the apparatus to provide a local hazard warning to at least one vehicle comprises causing the apparatus to:

provide a local hazard warning for presentation to a user of the vehicle on a user interface of the vehicle.

4. The apparatus of claim 1, wherein the apparatus is further configured to:

generate an estimation of intensity of a weather condition at each of the plurality of locations proximate the location of the observed weather condition.

5. The apparatus of claim 4, wherein causing the apparatus to generate the estimation of intensity of a weather condition at each of the plurality of locations comprises causing the apparatus to:

receive weather radar imagery comprising each of the plurality of locations; and determine, for each of the plurality of locations, an estimation of intensity of a weather condition based on the weather radar imagery corresponding to the respective location.

6. The apparatus of claim 1, wherein the indication of a weather condition from the probe comprises an indication of rain or fog at the location of the probe.

7. A computer program product comprising at least one non-transitory computer-readable storage medium having computer-executable program code instructions stored therein, the computer-executable program code instructions comprising program code instructions to:

receive an indication of an observed weather condition from a probe;

receive an indication of a location of the observed weather condition from the probe;

generate an estimation of a local hazard at a plurality of locations proximate the location of the observed weather condition;

determine a distance of each of the plurality of locations from the location of the observed weather condition;

determine an elapsed time since the observed weather condition was observed;

generate a confidence level of the local hazard at each of the plurality of locations proximate the location of the observed weather condition, wherein the confidence level of the local hazard at each of the plurality of locations is calculated using an inverse ratio of the a distance of each respective location of the plurality of locations from the location of the observed weather condition and an inverse ratio of the elapsed time since the weather condition was observed such that the time and distance are inversely proportional to the confidence level; and generate a local hazard warning for at least one of the plurality of locations in response to the confidence level for the at least one of the plurality of locations satisfying a predefined measure.

8. The computer program product of claim 7, wherein each of the plurality of locations comprises a reference location for a geographic area, and wherein the program code instructions to generate a local hazard warning for at least one of the plurality of locations comprises program code instructions to:

provide a local hazard warning to at least one vehicle located within at least one of the plurality of locations having a confidence level satisfying the predefined measure.

9. The computer program product of claim 8, wherein the program code instructions to provide a local hazard warning to at least one vehicle comprises program code instructions to:

provide a local hazard warning for presentation to a user of the vehicle on a user interface of the vehicle.

10. The computer program product of claim 8, further comprising program code instructions configured to:

generate an estimation of intensity of a weather condition at each of the plurality of locations proximate the location of the observed weather condition.

11. The computer program product of claim 10, wherein the program code instructions to generate the estimation of intensity of a weather condition at each of the plurality of locations comprises program code instructions to:

receive weather radar imagery comprising each of the plurality of locations; and determine, for each of the plurality of locations, an estimation of intensity of a weather condition based on the weather radar imagery corresponding to the respective location.

12. The computer program product of claim 7, wherein the indication of a weather condition from the probe comprises an indication of rain or fog at the location of the probe.

13. A method comprising:

receiving an indication of an observed weather condition from a probe;

receiving an indication of a location of the observed weather condition from the probe;

generating an estimation of a local hazard at a plurality of locations proximate the location of the observed weather condition;

determining a distance of each of the plurality of locations from the location of the observed weather condition;

determining an elapsed time since the observed weather condition was observed;

generating a confidence level of the local hazard at each of the plurality of locations proximate the location of the observed weather condition, wherein the confidence level of the local hazard at each of the plurality of locations is calculated using an inverse ratio of the a distance of each respective location of the plurality of locations from the location of the observed weather condition and an inverse ratio of the elapsed time since the observed weather condition was observed such that the time and distance are inversely proportional to the confidence level; and generating a local hazard warning for at least one of the plurality of locations in response to the confidence level for the at least one of the plurality of locations satisfying a predefined measure.

14. The method of claim 13, wherein each of the plurality of locations comprises a reference location for a geographic area, and wherein generating a local hazard warning for at least one of the plurality of locations comprises:

providing a local hazard warning to at least one vehicle located within at least one of the plurality of locations having a confidence level satisfying the predefined measure.

15. The method of claim 14, wherein providing a local hazard warning to at least one vehicle comprises:

providing a local hazard warning for presentation to a user of the vehicle on a user interface of the vehicle.

16. The method of claim 13, further comprising:

generating an estimation of intensity of a weather condition at each of the plurality of locations proximate the location of the weather condition from the probe.

17. The method of claim 16, wherein generating the estimation of intensity of a weather condition at each of the plurality of locations comprises:

receiving weather radar imagery comprising each of the plurality of locations; and determining, for each of the plurality of locations, an estimation of intensity of a weather condition based on the weather radar imagery corresponding to the respective location.

* * * * *

UNITED STATES PATENT AND TRADEMARK OFFICE
CERTIFICATE OF CORRECTION

Page 1 of 1

PATENT NO.         : 9,933,548 B1
APPLICATION NO.    : 15/392438
DATED              : April 3, 2018
INVENTOR(S)        : Stenneth et al.

It is certified that error appears in the above-identified patent and that said Letters Patent is hereby corrected as shown below:

In the Claims

Column 18,
Line 28, "claim 8" should read --claim 7--.

Signed and Sealed this
Twenty-fifth Day of September, 2018

Andrei Iancu
*Director of the United States Patent and Trademark Office*